US008772995B2

(12) United States Patent
Ogihara

(10) Patent No.: US 8,772,995 B2
(45) Date of Patent: Jul. 8, 2014

(54) STATOR FOR ELECTRIC ROTATING MACHINE

(75) Inventor: Hiroaki Ogihara, Kariya (JP)

(73) Assignee: Denso Corporation, Kariya (JP)

( * ) Notice: Subject to any disclaimer, the term of this patent is extended or adjusted under 35 U.S.C. 154(b) by 410 days.

(21) Appl. No.: 13/305,112

(22) Filed: Nov. 28, 2011

(65) Prior Publication Data

US 2012/0133235 A1   May 31, 2012

(30) Foreign Application Priority Data

Nov. 26, 2010 (JP) ................................. 2010-263202

(51) Int. Cl.
*H02K 3/12* (2006.01)
*H02K 15/085* (2006.01)

(52) U.S. Cl.
USPC .......................................... 310/184; 310/201

(58) Field of Classification Search
CPC .............. H02K 12/14; H02K 15/0414; H02K 15/0421; H02K 15/0428; H02K 15/064; H02K 15/067; H02K 15/0081; H02K 15/0087
USPC ............ 310/180, 184, 201, 208; 29/596, 606, 29/872
See application file for complete search history.

(56) References Cited

U.S. PATENT DOCUMENTS

| 6,501,206 | B2 * | 12/2002 | Oohashi et al. | ............... 310/184 |
| 6,865,796 | B1 * | 3/2005 | Oohashi et al. | .................. 29/596 |
| 6,921,863 | B2 * | 7/2005 | Oohashi et al. | ............. 174/74 R |
| 7,615,906 | B2 * | 11/2009 | Sakai et al. | .................... 310/184 |
| 2002/0033649 | A1 | 3/2002 | Oohashi et al. | |
| 2006/0267440 | A1 | 11/2006 | Sakai et al. | |

FOREIGN PATENT DOCUMENTS

| JP | 2000164043 A | * | 6/2000 | ............... H01B 7/00 |
| JP | 2000295821 A | * | 10/2000 | ............. H02K 15/04 |
| JP | B2-3303854 | | 7/2002 | |
| JP | A-2006-333562 | | 12/2006 | |
| JP | B2-3964116 | | 8/2007 | |

* cited by examiner

*Primary Examiner* — Burton Mullins
*Assistant Examiner* — Eric Johnson
(74) *Attorney, Agent, or Firm* — Oliff PLC

(57) ABSTRACT

A stator includes a stator coil that is formed of electric conductor segments welded to one another. Each of the electric conductor segments includes at least one joining portion that is welded to another one of the electric conductor segments. The joining portion includes a first part and a second part that are arranged in a longitudinal direction of the electric wire segment. The second part includes a distal end of the electric wire segment, and the first part is on the opposite side to the distal end. The first part extends with its cross-sectional area perpendicular to the longitudinal direction continuously decreasing at a first predetermined rate toward the second part. The second part extends with its cross-sectional area perpendicular to the longitudinal direction continuously decreasing at a second predetermined rate toward the distal end. The second predetermined rate is less than the first predetermined rate.

7 Claims, 6 Drawing Sheets

STATOR FOR ELECTRIC ROTATING MACHINE

CROSS-REFERENCE TO RELATED APPLICATIONS

This application is based on and claims priority from Japanese Patent Application No. 2010-263202, filed on Nov. 26, 2010, the content of which is hereby incorporated by reference in its entirety into this application.

BACKGROUND OF THE INVENTION

1 Technical Field of the Invention

The present invention relates to stators for electric rotating machines that are used in, for example, motor vehicles as electric motors and electric generators. In addition, the invention can also be applied to industrial machines and household electrical appliances.

2 Description of the Related Art

There are known stators for automotive electric rotating machines which include a stator coil formed by welding end portions of electric conductor segments.

Moreover, there are also known methods of reducing the heat input during the welding of the end portions, such as those disclosed in Japanese Patents No. 3303854 and No. 3964116.

Specifically, according to the method disclosed in Japanese Patent No. 3303854, each of the end portions of the electric conductor segments is stepped, as shown in FIG. 9, so as to have a reduced, constant cross-sectional area.

However, in the above case, during operation of the automotive electric rotating machine, in which the machine is subject to vibrations caused by running of the vehicle, or during the welding of the end portions of the electric conductor segments, in which each corresponding pair of the end portions are brought into contact with each other, stress concentration may occur at those parts of the end portions where the cross-sectional area is abruptly reduced. As a result, welds formed between the electric conductor segments may be easily broken.

On the other hand, according to the method disclosed in Japanese Patent No. 3964116, each of the end portions of the electric conductor segments includes, as shown in FIG. 10, a narrowing part in which the cross-sectional area of the end portion is continuously decreased toward the distal end of the end portion.

However, with the above method, if the decreasing rate of cross-sectional area of the narrowing part is set small, the length of the narrowing part will be large. As a result, the overall axial length of the stator coil will be accordingly increased, thereby making it difficult to minimize the size of the stator. In contrast, if the decreasing rate of cross-sectional area of the narrowing part is set large, the effect of reducing the heat input during the welding of the end portions of the electric conductor segments will be small. In other words, it is difficult to effectively reduce the heat input during the welding of the end portions.

SUMMARY

According to an exemplary embodiment, a stator for an electric rotating machine is provided which includes a stator core and a stator coil. The stator coil is formed of a plurality of electric conductor segments that are mounted on the stator core and welded to one another. Each of the electric conductor segments includes at least one joining portion that is welded to another one of the electric conductor segments. The joining portion includes a first part and a second part that are arranged in a longitudinal direction of the electric wire segment. The second part includes a distal end of the electric wire segment, and the first part is on the opposite side to the distal end. The first part extends with its cross-sectional area perpendicular to the longitudinal direction continuously decreasing at a first predetermined rate toward the second part. The second part extends with its cross-sectional area perpendicular to the longitudinal direction continuously decreasing at a second predetermined rate toward the distal end. The second predetermined rate is less than the first predetermined rate.

With the above configuration, it is possible to reduce stress induced in the joining portions of the electric conductor segments during operation of the electric rotating machine or during the welding of the joining portions of the electric conductor segments. Moreover, it is also possible to minimize the length of the joining portions of the electric conductor segments as well as reduce the heat input during the welding of the joining portions.

According to a further exemplary implementation, each of the first and second parts of the joining portion has a side surface. The side surface of the first part extends obliquely with respect to the longitudinal direction of the electric conductor segment at a first oblique angle. The side surface of the second part extends obliquely with respect to the longitudinal direction of the electric conductor segment at a second oblique angle that is less than the first oblique angle.

Moreover, the second side surfaces of the first and second parts of the joining portion may be smoothly connected to each other via a curved surface provided therebetween.

For each of the electric conductor segments, there is provided an insulating coat that partially covers the electric conductor segment so as not to cover the joining portion.

Further, each of the electric conductor segments includes a plurality of intersecting parts each of which is located outside of the stator core and intersects with another one of the electric conductor segments. All the intersecting parts are preferably completely covered with the insulating coat.

Each of the electric conductor segments is preferably made of a copper wire having a substantially rectangular cross section.

Each of the electric conductor segments has a substantially U-shape. For each of the electric conductor segments, the joining portion is formed at one end of the electric conductor segment. All the joining portions of the electric conductor segments are preferably arranged on the same axial side of the stator core.

BRIEF DESCRIPTION OF THE DRAWINGS

The present invention will be understood more fully from the detailed description given hereinafter and from the accompanying drawings of one exemplary embodiment, which, however, should not be taken to limit the invention to the specific embodiment but are for the purpose of explanation and understanding only.

In the accompanying drawings.

DESCRIPTION OF EMBODIMENT

Figure 1:
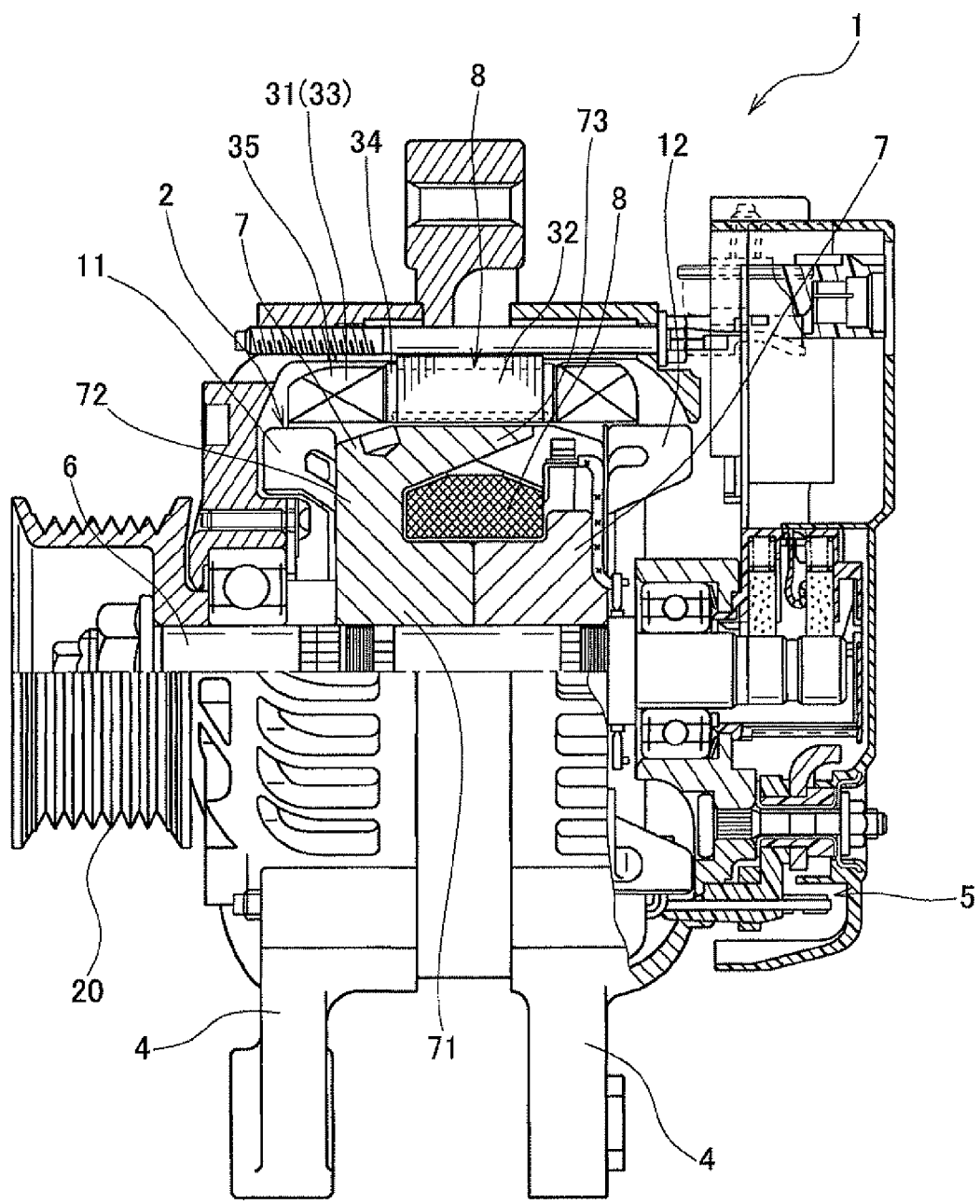
FIG. 1 is a partially cross-sectional view illustrating the overall configuration of an automotive alternator which includes a stator according an exemplary embodiment.

FIG. 1 shows the overall configuration of an automotive alternator 1 which includes a stator 3 according to an exemplary embodiment. The alternator 1 is designed to be used in a motor vehicle, such as a passenger car or a truck.

As shown in FIG. 1, the alternator 1 further includes a rotor 2, a frame 4 and a rectifier 5 in addition to the stator 3.

The rotor 2 includes a shaft 6, a pair of Lundell-type magnetic pole cores 7, a field coil 8, a mixed-flow fan 11 and a centrifugal fan 12.

The shaft 6 has a pulley 20 mounted on an end portion thereof (i.e., a left end portion in FIG. 1), so that it can be driven by an internal combustion engine of the vehicle via the pulley 20.

Each of the magnetic pole cores 7 has a hollow cylindrical boss portion 71, a disc portion 72, and a plurality of magnetic pole claws 73. The boss portion 71 is fitted on the shaft 6 so as to rotate along with the shaft 6. The disc portion 72 extends radially outward from an axially outer part of the boss portion 71. Each of the magnetic pole claws 73 axially extends from a radially outer part of the disc portion 72.

The magnetic pole cores 7 are assembled together so that the magnetic pole claws 73 of one of the magnetic pole cores 7 are interleaved with the magnetic pole claws 73 of the other magnetic pole core 7.

The field coil 8 is formed by winding an insulation-treated copper wire into a hollow cylindrical shape. The field coil 8 is mounted on both the boss portions 71 of the magnetic pole cores 7 so as to be axially interposed between the disc portions 72 of the magnetic pole cores 7. In addition, the field coil 8 also abuts a radially inner part of each of the magnetic pole claws 73 of the magnetic pole cores 7.

The mixed-flow fan 11 is fixed, for example by welding, to an axial end face of the disc portion 72 of that one of the magnetic pole cores 7 which is located on the pulley 20 side (i.e., the left side in FIG. 1). The mixed-flow fan 11 sucks cooling air from the pulley 20 side and discharges the same both in the axial and radial directions of the shaft 6. On the other hand, the centrifugal fan 12 is fixed, for example by welding, to an axial end face of the disc portion 72 of the other magnetic pole core 7 which is located on the opposite side to the pulley 20 (i.e., the right side in FIG. 1). The centrifugal fan 12 sucks cooling air from the opposite side to the pulley 20 and discharges the same in the radial direction of the shaft 6.

The stator 3 includes a hollow cylindrical stator core 32, a three-phase stator coil 31 that is formed of a plurality of electric conductor segments 33, and an insulator 34. The stator core 32 is formed by laminating a plurality of thin steel sheets. The stator core 32 has a plurality of slots formed in the radially inner surface thereof. The electric conductor segments 33 forming the stator coil 31 are partially received in the slots of the stator core 32. Those portions of the electric conductor segments 33 which are located outside of the slots make up coil ends 35 of the stator coil 31. The insulator 34 is in the form of a sheet and interposed between the stator core 32 and the electric conductor segments 33. Consequently, each of the electric conductor segments 33 is electrically insulated from the stator core 32 by both the insulator 34 and an insulating coat 39 formed at the surface of the electric conductor segment 33.

The frame 4 receives both the rotor 2 and the stator 3 so that the rotor 2 is rotatably supported by the frame 4 and the stator 3 is fixed on the radially outer side of the rotor 2 with a predetermined radial gap formed between the rotor 2 and the stator 3. In other words, the stator 3 is disposed radially outside of the rotor 2 so as to surround the rotor 2 with the predetermined radial gap therebetween.

The rectifier 5 is fixed to the outer surface of that axial end wall of the frame 4 which is located on the opposite side to the pulley 20. The rectifier 5 is configured to full-wave rectify three-phase AC power output from the stator coil 31 into DC power.

The automotive alternator 1 having the above-described configuration operates as follows. When torque is transmitted from the engine to the pulley 20 via a belt (not shown), the rotor 2 is driven by the torque to rotate in a given direction. During the rotation of the rotor 2, field current is supplied to the field coil 8, thereby magnetizing the magnetic pole claws 73 of the magnetic pole cores 7 to create a rotating magnetic field. The rotating magnetic field induces the three-phase AC power in the stator coil 31. The rectifier 5 full-wave rectifies the three-phase AC power output from the stator coil 31 into the DC power. The resultant DC power is then output from the alternator 1 via an output terminal of the rectifier 5.

Next, the configuration of the stator 3 will be described in detail. In the present embodiment, the stator coil 31 is formed by arranging the electric conductor segments 33 in a predetermined manner with respect to the stator core 32 and welding and thereby electrically connecting end portions of the electric conductor segments 33.

Figure 2:
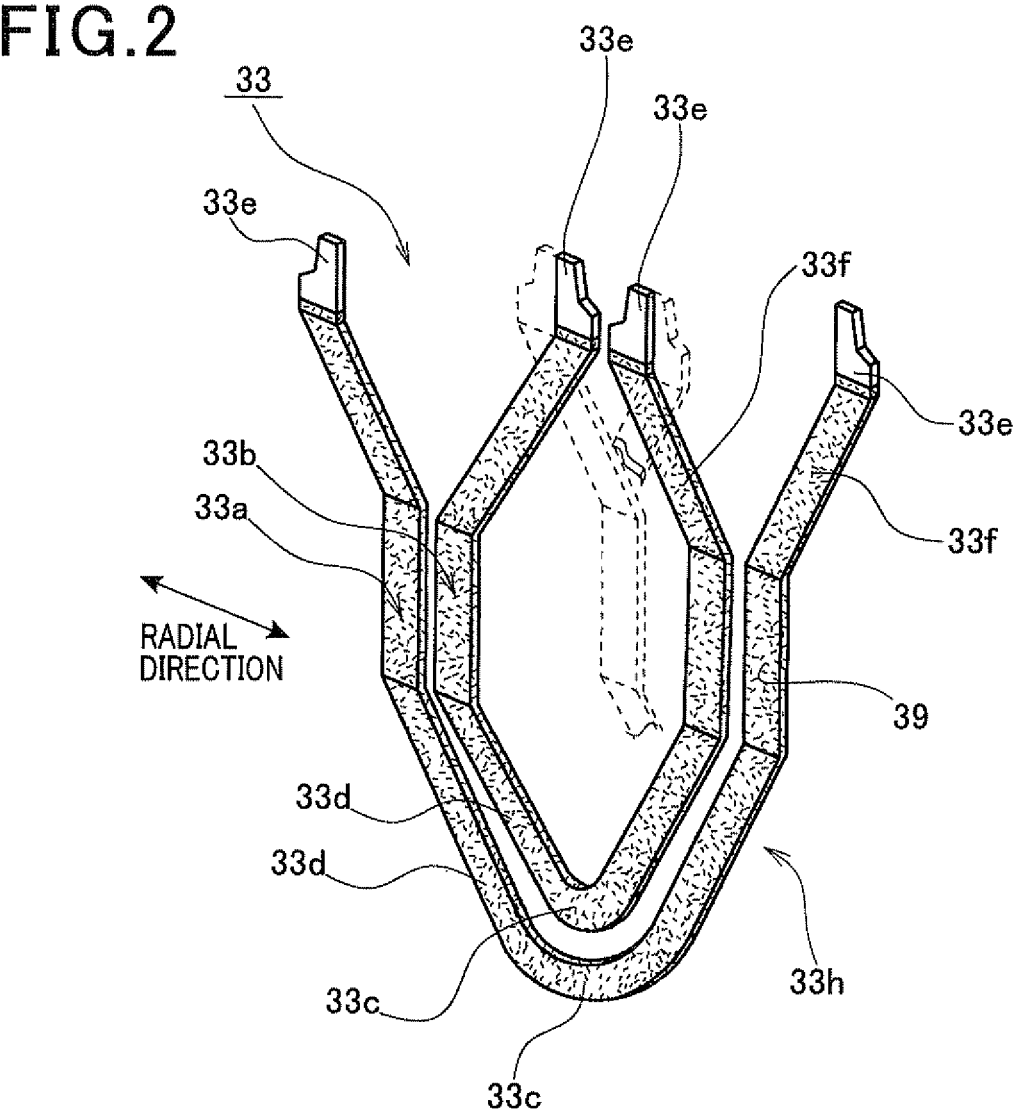
FIG. 2 is a perspective view illustrating the configuration of electric conductor segments which form a stator coil of the stator.

More specifically, in the present embodiment, the electric conductor segments 33 consist of a plurality of pairs of electric conductor segments 33a and 33b, the configuration of which is shown in FIG. 2.

Each of the electric conductor segments 33 is substantially U-shaped to include a turn portion 33c and a pair of end portions 33e. Each of the electric conductor segments 33 is partially inserted in a corresponding pair of the slots of the stator core 32.

The turn portions 33c of the electric conductor segments 33 form, together with oblique portions 33d of the electric conductor segments 33 which adjoin the respective turn portions 33c, that one of the coil ends 35 which is on the opposite side to the pulley 20.

On the other hand, the end portions 33e of the electric conductor segments 33 form, together with oblique portions 33f of the electric conductor segments 33 which adjoin the respective end portions 33e, the other coil end 35 which is on the pulley 20 side.

For each radially-adjacent pair of the electric conductor segments 33a and 33b, those oblique portions 33f of the pair of electric conductor segments 33a and 33b which protrude from the same slot of the stator core 32 are twisted so as to respectively extend in opposite circumferential directions of the stator core 32.

Moreover, in the present embodiment, each of the electric conductor segments 33 is made of, for example, a copper wire having a substantially rectangular cross section perpendicular to its longitudinal direction. Further, each of the electric conductor segments 33 is covered with the insulating coat 39 except for the end portions 33e. The insulating coat 39 functions as an electric insulator to insulate the electric conductor segment 33 from the stator core 32 as well as from other electric conductor segments 33.

Further, in the present embodiment, each corresponding pair of the end portions 33e of the electric conductor segments 33 are joined together by, for example, TIG (Tungsten Inert Gas) welding.

Figure 3:
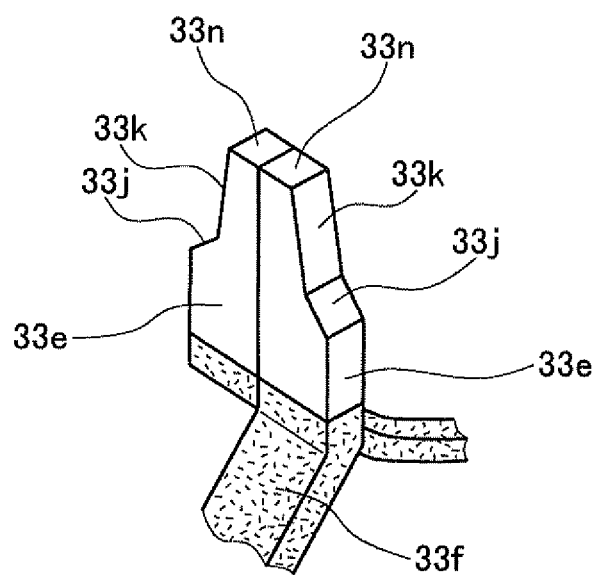
FIG. 3 is a perspective view showing a corresponding pair of end portions of the electric conductor segments before they are welded.
Figure 4:
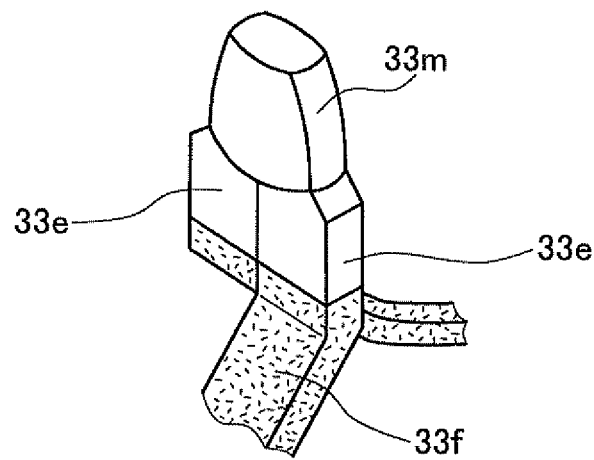
FIG. 4 is a perspective view showing a weld formed between the corresponding pair of end portions of the electric conductor segments.

Specifically, in welding each corresponding pair of the end portions 33e of the electric conductor segments 33, the end portions 33e are first brought into contact with each other, as shown in FIG. 3. Then, a tungsten electrode (not shown) is placed close to the end portions 33e, and an electric arc is generated between the end portions 33e. Consequently, the materials of the end portions 33e are first partially melted by heat of the electric arc, and then cool to form a substantially teardrop-shaped weld 33m as shown in FIG. 4.

Figure 5:
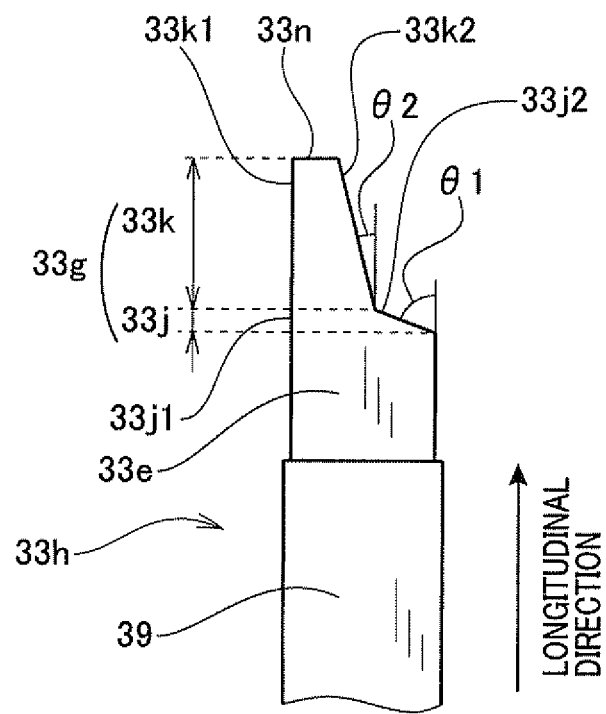
FIG. 5 is a plan view illustrating the configuration of the end portions of the electric conductor segments according to the embodiment.

FIG. 5 shows the configuration of the end portions 33e of the electric conductor segments 33 according to the present embodiment.

As shown in FIG. 5, in the present embodiment, each of the end portions 33e of the electric conductor segments 33 includes a joining portion 33g that is butted against and welded to an adjacent end portion 33e of another electric conductor segment 33. The joining portion 33g includes a first part 33j that is on the opposite side to the distal end 33n of the end portion 33e and a second part 33k that includes the distal end 33n. The first part 33j extends with its cross-sectional area perpendicular to the longitudinal direction (or extending direction) X of the electric conductor segment 33 continuously decreasing at a first predetermined rate. The second part 33k extends with its cross-sectional area perpendicular to the longitudinal direction X continuously decreasing at a second predetermined rate that is less than the first predetermined rate.

More specifically, in the present embodiment, the first part 33j has an opposite pair of first and second side surfaces 33j1 and 33j2. The first side surface 33j1 extends parallel to the longitudinal direction X, while the second side surface 33j2 extends obliquely with respect to the longitudinal direction X at a first oblique angle θ1. On the other hand, the second part 33k has an opposite pair of first and second side surfaces 33k1 and 33k2. The first side surface 33k1 extends parallel to the longitudinal direction X, while the second side surface 33k2 extends obliquely with respect to the longitudinal direction X at a second oblique angle θ2. The second oblique angle θ2 is set to be less than the first oblique angle θ1.

Moreover, in the present embodiment, for each of the electric conductor segments 33, a main portion 33h of the electric conductor segment 33 is completely covered with the insulating coat 39. Here, the main portion 33h denotes that part of the electric conductor segment 33 which extends between the end portions 33e and thus includes all the portions of the electric conductor segment 33 except for the end portions 33e. On the other hand, all of the end portions 33e are not covered with the insulating coat 39.

Figure 7:
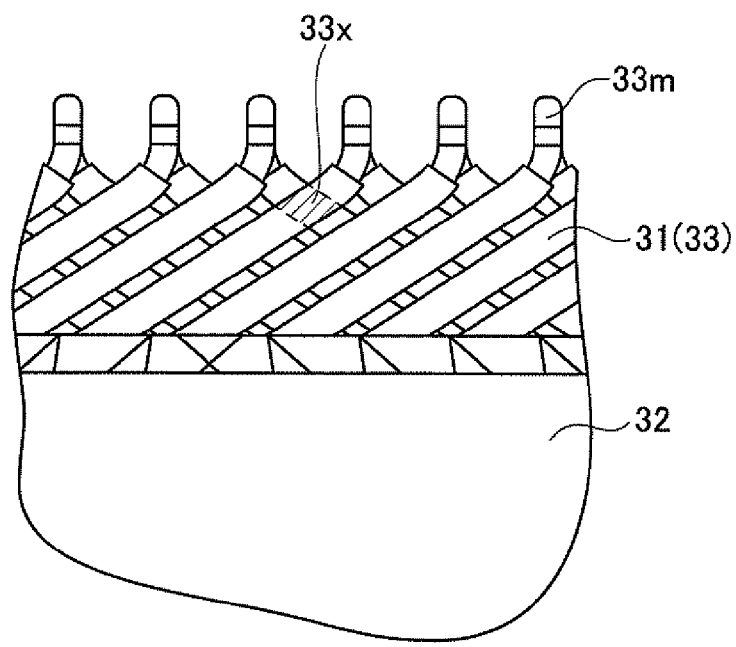
FIG. 7 is a schematic view illustrating intersecting parts of the electric conductor segments.

In addition, it should be noted that the main portion 33h is not necessarily completely covered with the insulating coat 39. However, in all cases, as shown in FIG. 7, it is preferable that at least intersecting parts 33x of the main portion 33h, each of which is located outside of the slots of the stator core 32 and intersects with another electric conductor segment 33, are completely covered with the insulating coat 39. In addition, the end portions 33e may also be covered with the insulating coat 39 except for the joining portions 33g. That is to say, in all cases, it is preferable that at least the joining portions 33g are not covered with the insulating coat 39.

The above-described stator 3 according to the present embodiment has the following advantages.

In the present embodiment, the stator 3 includes the stator coil 31 and the stator core 32. The stator coil 31 is formed of the electric conductor segments 33 that are mounted on the stator core 32 and welded to one another. Each of the electric conductor segments 33 includes the joining portions 33g which are respectively included in the end portions 33e of the electric conductor segment 33. Each of the joining portions 33g is welded to another one of the electric conductor segments 33. Each of the joining portions 33g includes the first and second parts 33j and 33k that are arranged in the longitudinal direction X of the electric wire segment 33. The second part 33k includes the distal end 33n of the electric wire segment 33, and the first part 33j is on the opposite side to the distal end 33n. The first part 33j extends with its cross-sectional area perpendicular to the longitudinal direction X continuously decreasing at the first predetermined rate toward the second part 33k. The second part 33k extends with its cross-sectional area perpendicular to the longitudinal direction X continuously decreasing at the second predetermined rate toward the distal end 33n. The second predetermined rate is less than the first predetermined rate.

Further, in the present embodiment, the first and second parts 33j and 33k each have an opposite pair of first and second side surfaces. The first side surfaces 33j1 and 33k1 of the first and second parts 33j and 33k each extend parallel to the longitudinal direction X of the electric conductor segment 33 and are flush with each other. The second side surface 33j2 of the first part 33j extends obliquely with respect to the longitudinal direction X at the first oblique angle θ1. The second side surface 33k2 of the second part 33k extends obliquely with respect to the longitudinal direction X at the second oblique angle θ2 that is less than the first oblique angle θ1.

With the above configuration, it is possible to alleviate stress concentration occurring at the boundary between the first and second parts 33j and 33k. More specifically, the angle between the second side surfaces 33j2 and 33k2 of the first and second parts 33j and 33k becomes greater than 90° (i.e., becomes an obtuse angle), thereby alleviating stress concentration occurring at the boundary between the second side surfaces 33j2 and 33k2 of the first and second parts 33j and 33k. Consequently, it is possible to reduce stress induced in the joining portion 33g during operation of the automotive alternator 1 or during the welding of the joining portion 33g to the another electric conductor segment 33.

Moreover, with the above configuration, for reducing the heat input during the welding of the joining portion 33g to the another electric conductor segment 33, it is only necessary to make the second part 33k thin. Accordingly, it is possible to minimize the length of the joining portion 33g (i.e., the sum of lengths of the first and second parts 33j and 33k) as well as reduce the heat input during the welding.

In the present embodiment, for each of the electric conductor segments 33, there is provided the insulating coat 39 that covers only the main portion 33h of the electric conductor segment 33. In other words, the insulating coat 39 partially covers the electric conductor segment 33 so as not to cover the joining portions 33g.

Without providing the insulating coat 39 on the joining portions 33g, it is possible to prevent the insulating coat 39 from being deteriorated due to heat during the welding of the joining portions 33g to the other electric conductor segments 33. Further, in the present embodiment, since the cross-sectional area of the electric conductor segment 33 is considerably increased at the first parts 33j of the joining portions 33g, it is possible to suppress increase in the temperature of the main portion 33h of the electric wire segment 33 during the welding of the joining portions 33g to the other electric conductor segments 33. As a result, it is possible to more reliably prevent deterioration of the insulating coat 39, thereby securing high insulation properties of the insulating coat 39.

In the present embodiment, for each of the electric conductor segments 33, the main portion 33h of the electric conductor segment 33 includes the interesting parts 33x each of which is located outside of the slots of the stator core 32 and intersects with another one of the electric conductor segments 33. Moreover, all the intersecting parts 33x are completely covered with the insulating coat 39.

Consequently, with the insulating coat 39, it is possible to ensure electrical insulation between the electric conductor segments 33 belonging to different phases.

In the present embodiment, each of the electric conductor segments 33 is made of a copper wire having a substantially rectangular cross section.

Consequently, it is possible to secure a sufficiently large contact area between each corresponding pair of the joining portions 33g of the electric conductor segments 33, thereby ensuring high strength of the weld 33m formed therebetween. In addition, it is also possible to easily strip the insulating coat 39 off the joining portions 33g of the electric conductor segments 33.

Figure 6:
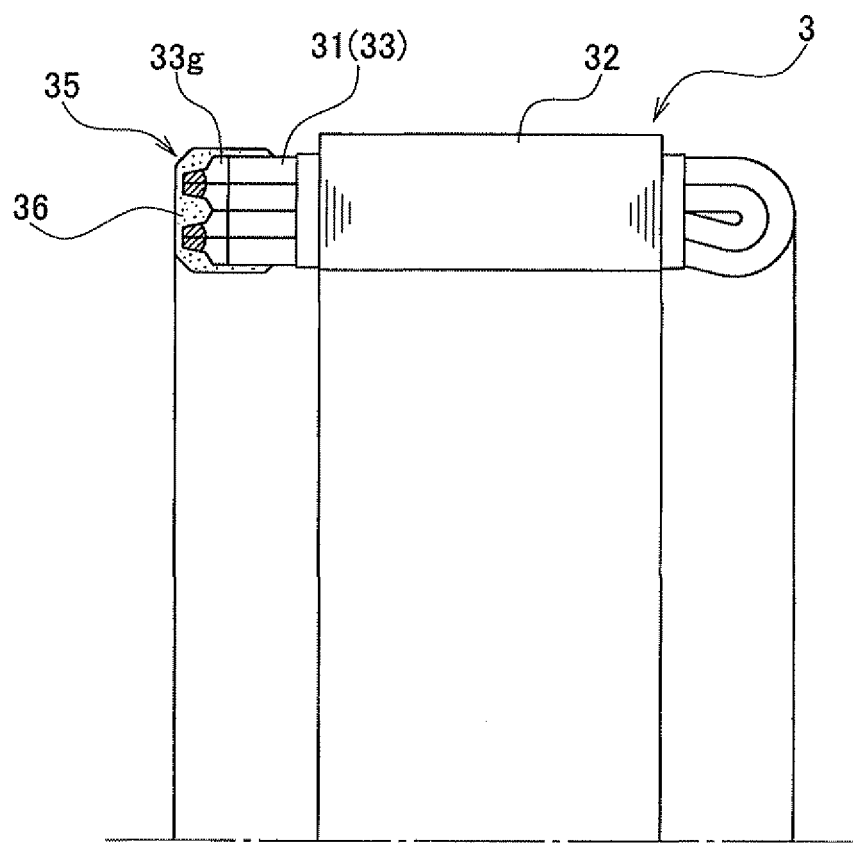
FIG. 6 is a partially cross-sectional view of the stator.

Furthermore, in the present embodiment, as shown in FIGS. 2 and 6, each of the electric conductor segments 33 has a substantially U-shape. For each of the electric conductor segments 33, the joining portions 33g are respectively formed at opposite longitudinal ends of the electric conductor segment 33. All the joining portions 33g of the electric conductor segments 33 are arranged on the same axial side (i.e., on the pulley 20 side) of the stator core 32.

Consequently, it is possible to easily perform the process of welding the corresponding pairs of the joining portions 33g of the electric conductor segments 33.

Moreover, after the welding process, all the welds 33m formed between the corresponding pairs of the joining portions 33g of the electric conductor segments 33 are arranged on the same axial side of the stator core 32 along the circumferential direction of the stator core 32. As a result, it is possible to easily apply an insulating material (e.g., a power resin) 36 to cover all the welds 33m, thereby fixing the welds 33m as well as electrically insulating the welds 33m from one another.

While the above particular embodiment has been shown and described, it will be understood by those skilled in the art that various modifications, changes, and improvements may be made without departing from the spirit of the invention.

For example, in the previous embodiment, the present invention is directed to the stator 3 of the automotive alternator 1. However, the invention can also be applied to stators for other electric rotating machines, for example a stator for an automotive motor-generator which can function both as an electric motor and as an electric generator.

Moreover, in the previous embodiment, each of the electric conductor segments 33 has the substantially rectangular cross section. However, each of the electric conductor segments 33 may also have, for example, a substantially square cross section or a substantially circular cross section.

In the previous embodiment, the stator coil 3 is formed by welding corresponding pairs of the electric conductor segments 33 each of which has the substantially U-shape. However, the invention can also be applied to a stator that includes a stator coil formed by welding corresponding pairs of electric wires that are much longer than the electric conductor segments 33.

In the previous embodiment, for each of the joining portions 33g of the electric conductor segments 33, the second side surfaces 33j2 and 33k2 of the first and second parts 33j and 33k of the joining portion 33g are directly connected to each other, forming an obtuse angle therebetween.

Figure 8:
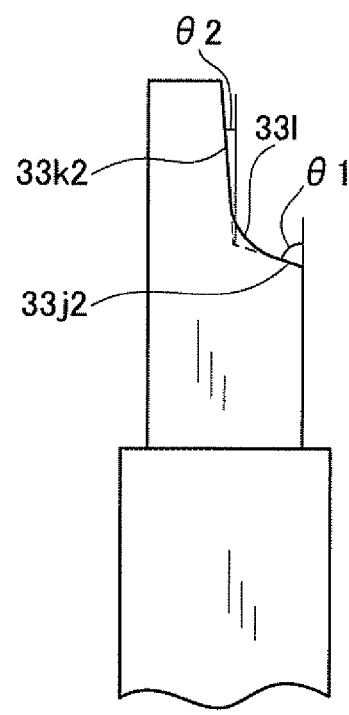
FIG. 8 is a plan view illustrating the configuration of the end portions of the electric conductor segments according a modification.
Figure 9:
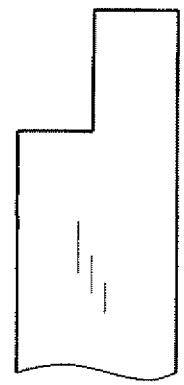
FIG. 9 is a plan view illustrating the configuration of end portions of electric conductor segments according one prior art.
Figure 10:
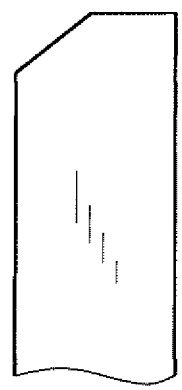
FIG. 10 is a plan view illustrating the configuration of end portions of electric conductor segments according another prior art.

However, as shown in FIG. 8, each of the joining portions 33g of the electric conductor segments 33 may also be configured so that the second side surfaces 33j2 and 33k2 of the first and second parts 33j and 33k of the joining portion 33g are smoothly connected to each other via a curved surface 33l provided therebetween. In this case, it is possible to more effectively alleviate stress concentration occurring at the boundary between the first and second parts 33j and 33k.

What is claimed is:

1. A stator for an electric rotating machine, the stator comprising a stator core and a stator coil, wherein
    the stator coil is formed of a plurality of electric conductor segments that are mounted on the stator core and welded to one another,
    each of the electric conductor segments includes at least one joining portion that is welded to another one of the electric conductor segments,
    the joining portion includes a first part and a second part that are arranged in a longitudinal direction of the electric wire segment,
    the second part includes a distal end of the electric wire segment, and the first part is on the opposite side to the distal end,
    the first part extends with its cross-sectional area perpendicular to the longitudinal direction continuously decreasing at a first predetermined rate toward the second part,
    the second part extends with its cross-sectional area perpendicular to the longitudinal direction continuously decreasing at a second predetermined rate toward the distal end, and
    the second predetermined rate is less than the first predetermined rate.

2. The stator as set forth in claim 1, wherein each of the first and second parts of the joining portion has a side surface,
    the side surface of the first part extends obliquely with respect to the longitudinal direction of the electric conductor segment at a first oblique angle, and
    the side surface of the second part extends obliquely with respect to the longitudinal direction of the electric conductor segment at a second oblique angle that is less than the first oblique angle.

3. The stator as set forth in claim 2, wherein the second side surfaces of the first and second parts of the joining portion are smoothly connected to each other via a curved surface provided therebetween.

4. The stator as set forth in claim 1, wherein for each of the electric conductor segments, there is provided an insulating coat that partially covers the electric conductor segment so as not to cover the joining portion.

5. The stator as set forth in claim 4, wherein each of the electric conductor segments includes a plurality of intersecting parts each of which is located outside of the stator core and intersects with another one of the electric conductor segments, and all the intersecting parts are completely covered with the insulating coat.

6. The stator as set forth in claim 1, wherein each of the electric conductor segments is made of a copper wire having a substantially rectangular cross section.

7. The stator as set forth in claim 1, wherein each of the electric conductor segments has a substantially U-shape, for each of the electric conductor segments, the joining portion is formed at one end of the electric conductor segment, and all the joining portions of the electric conductor segments are arranged on the same axial side of the stator core.

* * * * *